(12) United States Patent
Laukkanen et al.

(10) Patent No.: US 10,787,175 B1
(45) Date of Patent: Sep. 29, 2020

(54) METHOD OF CALIBRATING AN OPTICAL SURFACE CONDITION MONITORING SYSTEM, ARRANGEMENT, APPARATUS AND COMPUTER READABLE MEMORY

(71) Applicant: Vaisala Oyj, Vantaa (FI)

(72) Inventors: Samuli Laukkanen, Helsinki (FI); Timo Hyvättinen, Helsinki (FI)

(73) Assignee: Vaisala Oyj, Vantaa (FI)

( * ) Notice: Subject to any disclaimer, the term of this patent is extended or adjusted under 35 U.S.C. 154(b) by 0 days.

(21) Appl. No.: 16/840,496

(22) Filed: Apr. 6, 2020

(30) Foreign Application Priority Data

May 21, 2019 (FI) .................................... 20195419

(51) Int. Cl.
*B60W 40/06* (2012.01)
*G08G 1/0967* (2006.01)

(52) U.S. Cl.
CPC ....... *B60W 40/06* (2013.01); *G08G 1/096708* (2013.01); *B60W 2552/00* (2020.02); *B60W 2555/00* (2020.02)

(58) Field of Classification Search
None
See application file for complete search history.

(56) References Cited

U.S. PATENT DOCUMENTS

| 6,040,916 | A | 3/2000 | Griesinger | |
|---|---|---|---|---|
| 8,248,256 | B1 * | 8/2012 | Gerardi | G08B 21/20 340/604 |
| 8,796,627 | B2 * | 8/2014 | Rockwell | G01N 21/55 250/341.8 |
| 9,721,460 | B2 * | 8/2017 | Takemura | G06K 9/00798 |
| 9,829,380 | B2 * | 11/2017 | Itoh | G01N 21/359 |
| 10,442,438 | B2 * | 10/2019 | Fritz | G06K 9/00798 |
| 10,621,865 | B2 * | 4/2020 | Renno | G01J 1/0488 |
| 2003/0001509 | A1 * | 1/2003 | Leleve | B60Q 1/0023 315/77 |
| 2015/0211928 | A1 | 7/2015 | Itoh et al. | |
| 2017/0096144 | A1 | 4/2017 | Elie et al. | |
| 2017/0293814 | A1 * | 10/2017 | Elie | B60R 11/04 |
| 2018/0362048 | A1 * | 12/2018 | Juno | G01C 21/00 |

* cited by examiner

*Primary Examiner* — Natalie Huls
*Assistant Examiner* — Jermaine L Jenkins
(74) *Attorney, Agent, or Firm* — Laine IP Oy

(57) ABSTRACT

A method and apparatus for calibrating an optical surface condition monitoring system (1). Light beams at different wavelengths ($\lambda_1$, $\lambda_2$) are emitted to a reference substrate (2) at different distances ($L_1$, $L_2$) as well as to sample substrates (5) at a specific distance ($L_{specific}$). Subsequently, ratios between the signals scattered back from the reference substrate (2) and the signals scattered back from the sample substrates (5) are calculated. Then, input data regarding a measurement distance ($L_{measurement}$) between a target surface (8) to be monitored, for example a road, and the receiver (3) of the system (1) is provided. Further, a preset program is selected. Dry calibration of the system (1) can then take place based on the calculated ratios, the measurement distance ($L_{measurement}$) and the selected program. Dry calibration can be calculated without having to perform an actual dry calibration in the field and no dry calibration plate or dry spot of the target surface (8) is required.

14 Claims, 6 Drawing Sheets

METHOD OF CALIBRATING AN OPTICAL SURFACE CONDITION MONITORING SYSTEM, ARRANGEMENT, APPARATUS AND COMPUTER READABLE MEMORY

FIELD

The present invention relates to a method of calibrating an optical surface condition monitoring system.

Further, the present invention relates to an arrangement for calibrating an optical surface condition monitoring system.

Furthermore, the present invention relates to an apparatus.

Additionally, the present invention relates to a computer readable medium.

BACKGROUND

Surfaces which are located in an outdoor environment may be exposed to water, snow, ice or other material particles. Optical surface condition monitoring systems are capable of providing data relating to real-time surface condition information. An example of an optical surface condition monitoring system is a measurement system such as a road condition monitoring system. The systems are related to monitoring and maintenance of transportation infrastructure, such as highways, city streets, back roads and runways. The systems may be also used to allow evaluation and analysis to improve repair response time and facilitate accurate prediction of roadway breakdown.

The road condition monitoring systems are typically attached to vehicles and used during movement of the vehicles. However, also stationary road condition monitoring systems are known. Normally, the road condition monitoring systems are used at least during the winter season. Various parameters such as a water layer thickness, an ice layer thickness, a surface temperature, and a dew point temperature may be measured or evaluated by the road condition monitoring systems. An example of a road condition monitoring system is the Teconer Road Condition Monitor RCM411™.

Known optical road condition monitoring systems typically emit at least two light beams at different wavelengths. The first wavelength may be, for example, more sensitive to water on a surface. The second wavelength may be, for example, more sensitive to ice on a surface. Subsequently, signals scattered (back) by a target surface to be monitored are received by a receiver of the optical road condition monitoring system. The condition of the target surface to be monitored can be estimated or determined based on the received signals.

Available optical road condition monitoring systems require a so-called "dry calibration" before the sensor can be used. Dry calibration has to be carried out for each and every optical road condition monitoring system. Further, a dry calibration has to be carried out each and every time an optical road condition monitoring system is re-attached to a structure, for example to a vehicle or to a mast, at a different height above the target surface to be monitored. This is also called "unit-dependent distance dependency response for each sensor". Additionally, dry calibration is often carried out again in case that the initial dry calibration leads to obvious errors in the measurement results.

Typically a dry road surface spot has to be found for the dry calibration of the road condition monitoring systems. Alternatively, dry calibration can be carried out using a specific dry calibration plate or sample plate placed on the ground. Both alternatives have their disadvantages. In the first alternative, dry road surfaces are likely very hard to find at wintertime. Furthermore, the utilized spot may not be representative of average surface properties in the area of interest, thus leading to performance issues. In the second alternative, it may be challenging to position the sample plate into the optical beam of the optical road condition monitoring system. Additionally, the sample plate needs to be protected against rainfall, snowfall and condensation. Therefore, use of the sample plate is hard or even impossible in actual wintertime field conditions.

In view of the foregoing, it would be beneficial to provide a method of calibrating an optical surface condition monitoring system, wherein neither a dry surface spot has to be found nor a calibration plate has to be used for initial calibration of the optical surface condition monitoring system.

SUMMARY OF THE INVENTION

The invention is defined by the features of the independent claims. Some specific embodiments are defined in the dependent claims.

According to a first aspect of the present invention, there is provided a method of calibrating an optical surface condition monitoring system, the method comprising emitting a first light beam at a first wavelength and a second light beam at a second wavelength by the optical surface condition monitoring system to a reference substrate, receiving first signals scattered (back) from the reference substrate at a first distance between the optical surface condition monitoring system and the reference substrate by a receiver of the optical surface condition monitoring system, varying a distance between the optical surface condition monitoring system and the reference substrate from the first distance to a second distance, and receiving second signals scattered (back) from the reference substrate at the second distance between the optical surface condition monitoring system and the reference substrate by the receiver of the optical surface condition monitoring system.

Various embodiments of the first aspect may comprise at least one feature from the following bulleted list:

- the distance between the optical surface condition monitoring system and the reference substrate is continuously or step-wise varied between the first distance and the second distance
- the distance between the optical surface condition monitoring system and the reference substrate is varied manually or by a linear motor configured to move the reference substrate along a linear guiding
- the first distance is 0.25 m or more, for example 0.3 m
- the second distance is 15 m or less, in particular 10 m or less, preferably 5 m or less, for example 1.3 m
- the second distance is greater than the first distance
- signals scattered (back) from the reference surface are received by the receiver of the optical surface condition monitoring system during continuous or step-wise variation of the distance between the optical surface condition monitoring system and the reference substrate
- the reference substrate is made of an optically homogenous diffuse reflective material
- the material of the reference substrate is Teflon, Teflon-based material, OP.DI.MA or ODM98
- the material of the reference substrate provides a reflection of 90% or more, preferably 95% or more, for example 98% at the wavelength region utilized by the surface condition measurement system the material of the reference substrate provides a reflection of 90% or more, preferably 93% or more, for example 93.5% within the wavelength range from 250 nm to 2.5 µm at least a part of the reference substrate is coated with Barium-Sulfate paint the reference substrate is provided in block or plate form the reference substrate provides a planar reference surface the reference surface of the reference substrate is arranged at an angle in the range between 0° and 85°, preferably at an angle in the range between 25° and 45°, for example at an angle of 30° relative to at least one of the first light beam and the second light beam signals, which have been scattered (back) from the reference substrate and received by the receiver of the optical surface condition monitoring system, and the respective measurement distances are stored in a memory of the optical surface condition monitoring system the method further comprising emitting at least the first light beam at the first wavelength and the second light beam at the second wavelength by the optical surface condition monitoring system to a sample substrate which is arranged at a specific distance from the optical surface condition monitoring system in the range between the first distance and the second distance, and receiving at least third signals scattered (back) from the sample substrate at the specific distance by the receiver of the optical surface condition monitoring system repeating the aforementioned method feature for a plurality of different sample substrates the specific distance and the first distance or the specific distance and the second distance are identical the sample substrate is made of a material or substantially made of a material of the target surface to be monitored the material of the sample substrate is asphalt, concrete, stone and the like the sample surface of the sample substrate is arranged at an angle in the range between 0° and 85°, preferably at an angle in the range between 25° and 45°, for example at an angle of 30° relative to at least one of the first light beam and the second light beam the sample surface and the reference surface are arranged at an identical angle relative to at least one of the first light beam and the second light beam signals, which have been scattered (back) from the sample substrate and received by the receiver of the optical surface condition monitoring system, and information of respective measurement distances are stored in a memory of the optical surface condition monitoring system the method yet further comprising calculating ratios between the signals, which have been scattered (back) from the sample substrate, and signals, which have been scattered (back) from the reference substrate at the specific distance repeating the aforementioned method feature for a plurality of different sample substrates the ratios between the signals, which have been scattered (back) from the reference substrate, and the signals, which have been scattered (back) from the sample substrate, are stored in the memory of the optical surface condition monitoring system the method even further comprising providing to the optical surface condition monitoring system input data regarding a measurement distance between a target surface to be monitored, for example a road surface, and the optical surface condition monitoring system, and selecting a preset program stored in the memory of the optical surface condition monitoring system According to a second aspect of the present invention, there is provided an arrangement comprising a first setup and a second setup, wherein the first setup includes an optical surface condition monitoring system configured to emit light beams at at least two different wavelengths, a reference substrate having a reference surface arranged at a distance from the optical surface condition monitoring system, means for varying the distance between the optical surface condition monitoring system and the reference substrate at least from a first distance to a second distance, and wherein the second setup includes the optical surface condition monitoring system, and a sample substrate having a sample surface arranged at a specific distance from the optical surface condition monitoring system, wherein the specific distance is in the range between the first distance and the second distance.

Various embodiments of the second aspect may comprise at least one feature from the following bulleted list:

the means for varying the distance between the optical surface condition monitoring system and the reference substrate comprise a linear motor configured to move the reference substrate along a linear guiding the reference substrate is made of an optically homogenous diffuse reflective material the material of the reference substrate is Teflon, Teflon-based material, OP.DI.MA or ODM98 the material of the reference substrate provides a reflection of 90% or more, preferably 95% or more, for example 98% at the wavelength region utilized by the surface condition measurement system the material of the reference substrate provides a reflection of 90% or more, preferably 93% or more, for example 93.5% within the wavelength range from 250 nm to 2.5 µm at least a part of the reference substrate is coated with Barium-Sulfate paint the reference substrate is provided in block or plate form the reference substrate provides a planar reference surface the reference surface of the reference substrate is arranged at an angle in the range between 0° and 85°, preferably at an angle in the range between 25° and 45°, for example at an angle of 30° relative to at least one of the first light beam and the second light beam a processor comprising at least one processing core at least one memory including computer program code According to a third aspect of the present invention, there is provided an apparatus comprising at least a first light source configured to emit a first light beam at a first wavelength and a second light source configured to emit a second light beam at a second wavelength, at least one receiver, a processor comprising at least one processing core, at least one memory including computer program code, the at least one memory and the computer program code being configured to, with the at least one processing core, cause the apparatus at least to emit at least a first light beam at a first wavelength and a second light beam at a second wavelength, store at least first and second signals received by the receiver, wherein the first and second signals have been scattered (back) from a reference substrate, store third signals received by the receiver, wherein the third signals have been scattered (back) from a sample substrate, receive input data regarding a measurement distance between a target surface and the receiver, receive input data regarding selection of a preset program which depends on the target surface to be monitored, calculate ratios between the signals, which have been scattered (back) from the sample substrate, and the signals, which have been scattered (back) from the reference substrate at a specific distance between the reference substrate and the at least one receiver, and calibrate the apparatus based on the input data regarding the measurement distance, a selected preset program and the calculated ratios.

Various embodiments of the third aspect may comprise at least one feature from the following bulleted list:
the apparatus comprises a user interface
the apparatus comprises a display
the apparatus comprises a third light source configured to emit a light beam at a third wavelength
the apparatus comprises a fourth light source configured to emit a light beam at a fourth wavelength
the apparatus comprises a transmitter for transmitting data and a second receiver for receiving data
the apparatus comprises a distance sensor
the apparatus is configured to monitor surface condition of a target surface such as used as road pavements, for example road asphalt, new road asphalt, old road asphalt, partially degraded asphalt, and the like According to a fourth aspect of the present invention, there is provided a non-transitory computer readable memory having stored thereon a set of computer implementable instructions capable of causing a computing device, in connection with an optical surface condition monitoring system, at least to cause a first light source to emit a first light beam at a first wavelength, cause a second light source to emit a second light beam at a second wavelength, store first and second signals received by a receiver, wherein the first and second signals have been scattered (back) from a reference substrate, store third signals received by the receiver, wherein the third signals have been scattered (back) from a sample substrate, receive input data regarding a distance between a target surface and the receiver, receive input data regarding selection of a preset program by a user, wherein the preset program depends on the target surface to be monitored, calculate ratios between the signals, which have been scattered (back) from the sample substrate, and the signals, which have been scattered (back) from the reference substrate at a specific distance, and calibrate the apparatus based on the input data regarding the measurement distance, a selected preset program and the calculated ratios.

Considerable advantages are obtained by means of certain embodiments of the present invention. A method of calibrating an optical surface condition monitoring system, an arrangement for calibrating an optical surface condition monitoring system, an apparatus and a computer readable medium are provided. According to the method, neither a dry surface spot has to be found nor a calibration plate has to be used for initial calibration of the optical surface condition monitoring system. The user does not have to leave the vehicle in order to position the dry calibration plate. The method of calibrating the surface condition monitoring system can be carried out easily. Repeating calibration always provides the same calibration result, and thus erroneous calibration can be avoided, because the optical surface condition monitoring system according to certain embodiments of the present invention has been already characterized for all admissible measurement distances and for particular materials during manufacturing. Dry calibration can be therefore calculated without having to perform an actual dry calibration in the field. During dry calibration of the system, the receiver does not even have to receive any signals or the surface to be monitored can be wet or covered with ice or snow.

According to certain embodiments of the present invention, a user typically only has to provide input data relating to a measurement distance between the optical surface condition monitoring system and the target surface and to select a preset program relating to the target material to be monitored.

According to certain embodiments of the present invention, a user does not have to provide input data relating to a measurement distance between the optical surface condition monitoring system and the target surface, because the input data is automatically provided by a distance sensor.

BRIEF DESCRIPTION OF THE DRAWINGS

For a more complete understanding of particular embodiments of the present invention and their advantages, reference is now made to the following descriptions, taken in conjunction with the accompanying drawings. In the drawings.

EMBODIMENTS

In this document the expressions "target material", "reference material" and "sample material" are being used. The expression "target material" means a material of a surface to be monitored, for example the material of a road. The expression "reference material" means a material used in connection with calibration of the optical surface condition monitoring system as e.g. disclosed in connection with FIG. 2A. The material of the reference material and the material of the target material are typically different from each other. The expression "sample material" means a material used in connection with calibration of the optical surface condition monitoring system as e.g. disclosed in connection with FIG. 2B. Typically, a plurality of sample materials is used, for example old asphalt, new asphalt, etc.

Figure 1:
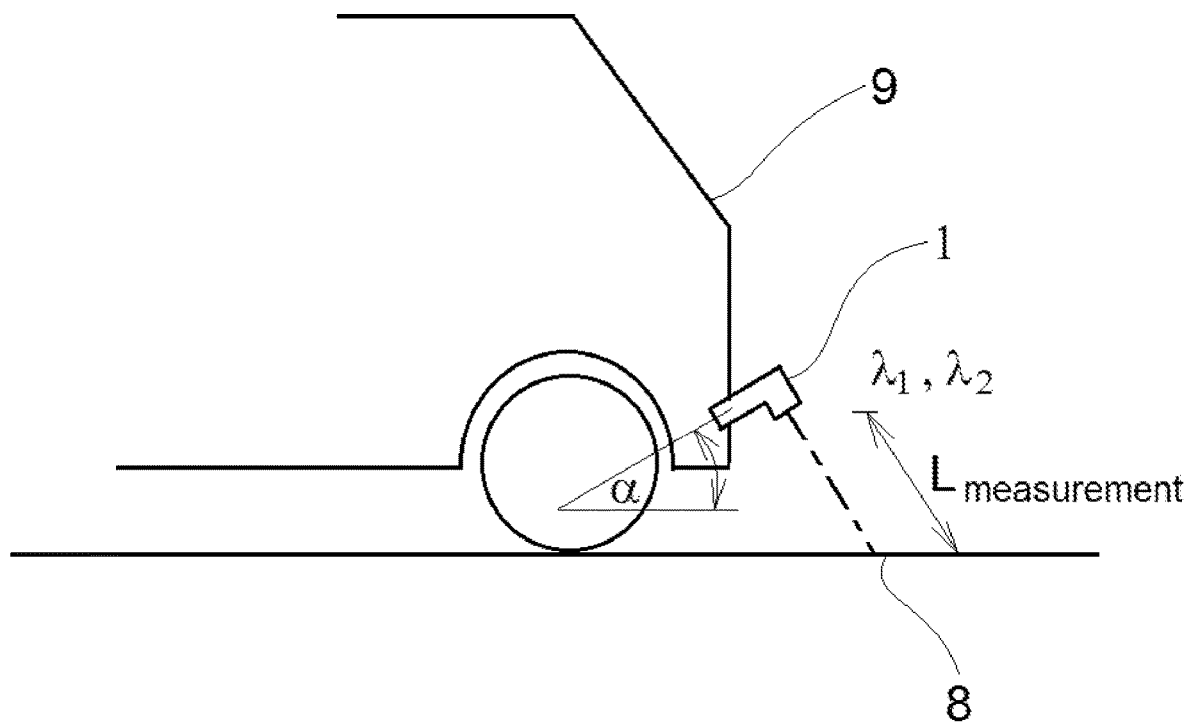
FIG. 1 illustrates a schematic view of a commercially available optical surface condition monitoring system attached to a vehicle.

In FIG. 1 a schematic view of a commercially available optical surface condition monitoring system 1 is illustrated, wherein the optical surface condition monitoring system 1 in the form of a road condition monitoring system is attached to a vehicle 9. The road condition monitoring system 1 is attached to the vehicle 9 at an attachment angle α at a specific attachment height above a target surface 8. A measurement distance $L_{measurement}$ between the optical road condition monitoring system 1 and the target surface 8 is depending on the attachment angle a and the specific attachment height. The attachment height may be, for example, 0.5 m. The optical surface condition monitoring system 1 comprises a first light source configured to emit a first light beam at a first wavelength $\lambda_1$. The system 1 further comprises a second light source configured to emit a second light beam at a second wavelength $\lambda_2$. Additionally, the system 1 comprises a receiver configured to receive signals scattered (back) from the target surface.

Figure 2A:
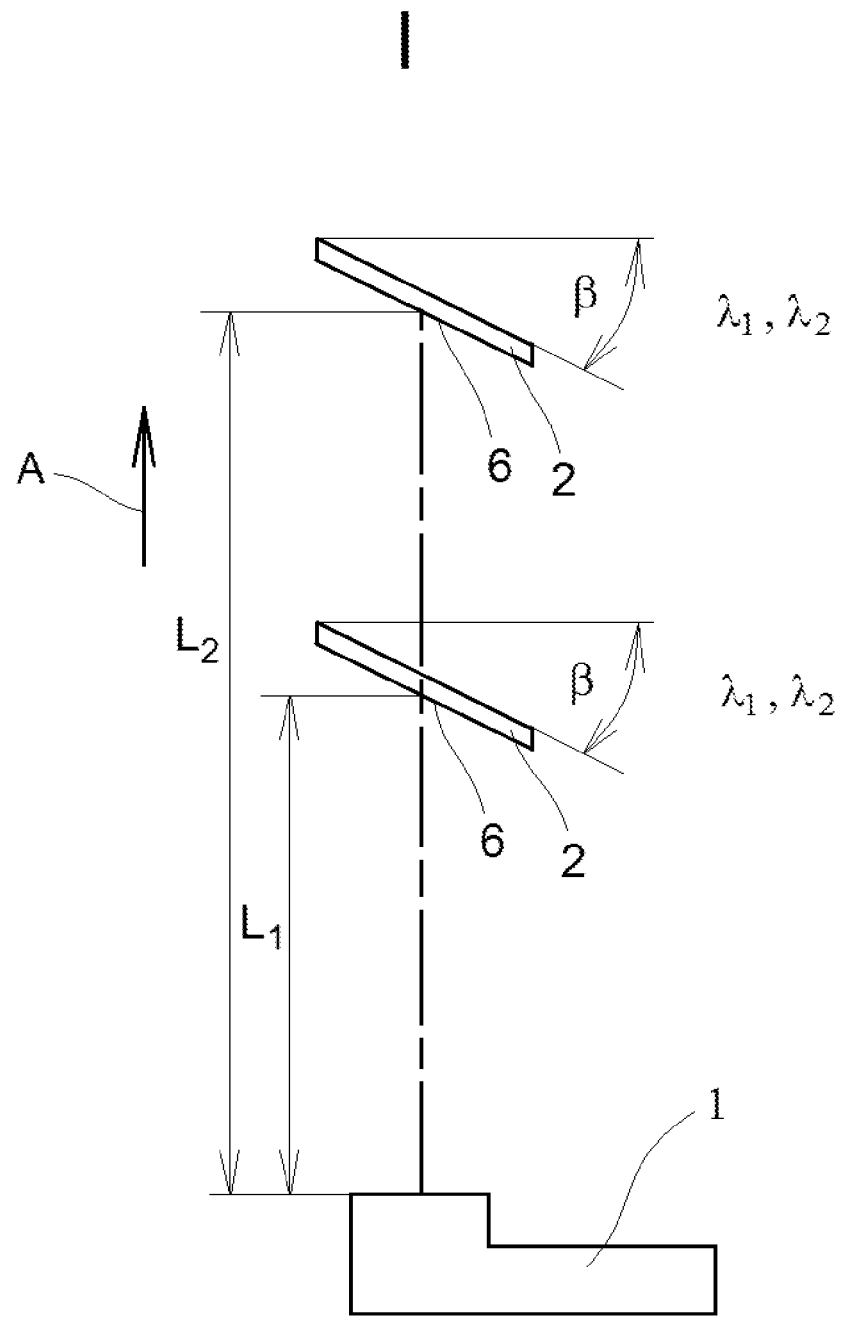
FIG. 2A illustrates a schematic view of a first setup of an arrangement in accordance with at least some embodiments of the present invention.

In FIG. 2A a schematic view of a first setup I of an arrangement in accordance with at least some embodiments of the present invention is illustrated. The first setup I includes an optical surface condition monitoring system 1 configured to emit light beams at at least two different wavelengths $\lambda_1$, $\lambda_2$. According to certain embodiments of the present invention, the optical surface condition monitoring system 1 is configured to emit light beams at three different wavelengths $\lambda_1$, $\lambda_2$, $\lambda_3$ or at four different wavelengths $\lambda_1$, $\lambda_2$, $\lambda_3$, $\lambda_4$.

The first setup I further includes a reference substrate 2 having a reference surface 6 arranged at a distance from the optical surface condition monitoring system 1. The reference substrate 2 is typically provided in block form or plate form having at least one reference surface 6. The reference substrate 2 may be made of an optically homogenous diffuse reflective material. The material of the reference surface 6 of the reference substrate 2 may be, for example, Teflon, Teflon-based material, OP.DI.MA (offered by Gigahertz-Optik GmbH, Germany) or ODM98. According to certain embodiments, the material of the reference substrate provides a reflection of 90% or more, preferably 95% or more, for example 98% at the wavelength region utilized by the surface condition measurement system or provides a reflection of 90% or more, preferably 93% or more, for example 93.5% within the wavelength range from 250 nm to 2.5 µm. According to certain embodiments, the reference substrate 2 may be alternatively covered with Barium-Sulfate paint in at least one measurement area of the reference surface 6, for instance. It is noted that the material of the reference substrate 2 and the material of a target surface to be monitored, for example the material of a road surface, are according to the present invention typically different from each other.

The reference surface 6 of the reference substrate 2 is typically arranged at an angle β in the range between 0° and 85°, preferably at an angle β in the range between 25° and 45°, for example at an angle β of 30° relative to at least one of the first light beam and the second light beam emitted from the optical surface condition monitoring system 1. The angle β is identical or substantially identical with the attachment angle α as shown in FIG. 1. In other words, the angle between the light beam(s) and the reference surface 6 of the reference substrate 2 is identical with the angle between the light beam(s) and the target surface 8 as shown in FIG. 1.

The first setup yet further includes means for varying a distance between the optical surface condition monitoring system 1 and the reference substrate 2 at least from a first distance $L_1$ to a second distance $L_2$. The means for varying the distance between the optical surface condition monitoring system 1 and the reference substrate 2 may be, for example, a linear motor configured to move the reference substrate 2 along a linear guiding. The reference substrate 2 may be moved step-wise or continuously relative to the optical surface condition monitoring system 1.

During calibration of the optical surface condition monitoring system 1, at least a first light beam at a first wavelength $\lambda_1$ and a second light beam at a second wavelength $\lambda_2$ are emitted by the optical surface condition monitoring system 1. Of course, also further light beams at other wavelengths may be emitted by the optical surface condition monitoring system 1. The first and second light beams are directed towards a reference surface 6 of the reference substrate 2. The reference surface 6 of the reference substrate 2 is positioned at a first distance $L_1$ from the optical surface condition monitoring system 1. The first distance $L_1$ is typically 0.25 m or more than 0.25 m, for example 0.3 m or 0.5 m. First measurement signals are then received by a receiver of the optical surface condition monitoring system 1. The first signals include at least one signal associated with the first wavelength $\lambda_1$ and one signal associated with the second wavelength $\lambda_2$. The first signals are typically stored in a memory of an apparatus or directly in the optical surface condition monitoring system 1.

Subsequently, the distance between the optical surface condition monitoring system 1 and the reference substrate 2 is varied at least from the first distance $L_1$ to a second distance $L_2$ as indicated by arrow A. Again at least a first light beam at the first wavelength $\lambda_1$ and a second light beam at the second wavelength $\lambda_2$ are emitted by the optical surface condition monitoring system 1. If required, also further light beams at other wavelengths are emitted by the optical surface condition monitoring system 1. The first and second light beams are directed towards the reference surface 6 of the reference substrate 2 positioned at the second distance $L_2$ from the optical surface condition monitoring system 1. The second distance $L_2$ is typically less than 15 m or less than 10 m, for example 1.3 m. Second measurement signals are then received by the receiver of the optical surface condition monitoring system 1. The second signals include at least one signal associated with the first wavelength $\lambda_1$ and one signal associated with the second wavelength $\lambda_2$. The second signals are typically also stored in the memory of the apparatus or directly in the optical surface condition monitoring system 1. The procedure of emitting light beams at different wavelengths and receiving signals may be repeated for any integer number of distances between the reference surface 6 of the reference substrate 2 and the optical surface condition monitoring system 1. An example of signals received at different distances is shown and described in connection with FIG. 3 for three different light beams.

Advantageously, the reference substrate 2 is made of an optically homogenous diffuse reflective material with uniform wavelength responses. Thus, reliable signals can be received subsequent to varying the distance between the optical surface condition monitoring system 1 and the reference substrate 2. Due to the distance variation, unit dependent distance dependency response information can be determined. Thus, the unit dependent information can be stored over the whole range of possible measurement distances during production of the optical surface condition monitoring system 1 at one run.

Figure 2B:
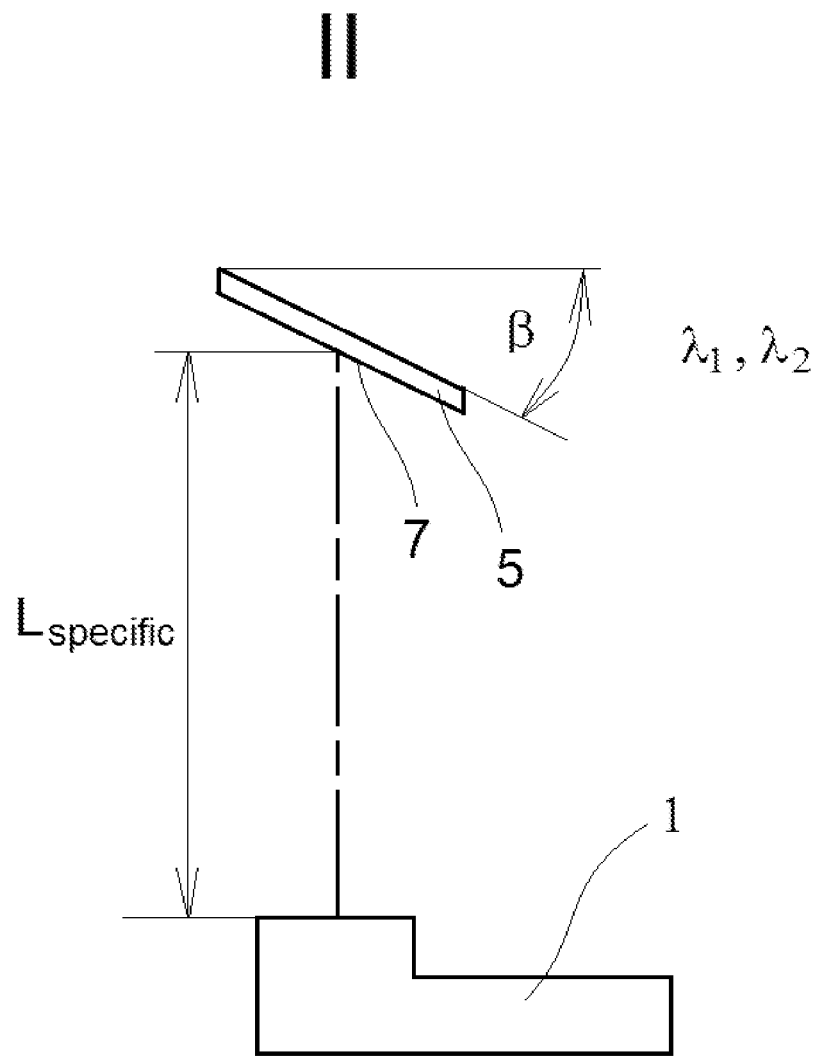
FIG. 2B illustrates a schematic view of a second setup of an arrangement in accordance with at least some embodiments of the present invention.

In FIG. 2B a schematic view of a second setup II of an arrangement in accordance with at least some embodiments of the present invention is illustrated. The second setup includes the optical surface condition monitoring system 1 used in the first setup I. The second setup II further includes a sample substrate 5 having a sample surface 7 arranged at a single specific distance $L_{specific}$ from the optical surface condition monitoring system 1. The single specific distance $L_{specific}$ is in the range between the first distance $L_1$ and the second distance $L_2$ as described above in connection with the first setup I. The single specific distance may be, for example, identical with the first distance $L_1$ or the second distance $L_2$.

The sample surface 7 of the sample substrate 5 is typically arranged at an angle β in the range between 0° and 85°, preferably at an angle β in the range between 25° and 45°, for example at an angle β of 30° relative to at least one of the first light beam and the second light beam emitted from the optical surface condition monitoring system 1. The angle β is identical or substantially identical with the attachment angle α as shown in FIG. 1. In other words, the angle between the light beam(s) and the sample surface 7 of the sample substrate 5 is identical with the angle between the light beam(s) and the target surface 8 as shown in FIG. 1.

At least the first light beam at the first wavelength $\lambda_1$ and the second light beam at the second wavelength $\lambda_2$ are emitted by the optical surface condition monitoring system 1 to the sample substrate 5 which is arranged at the specific distance $L_{specific}$ from the optical surface condition monitoring system 1 in the range between the first distance $L_1$ and the second distance $L_2$. Third signals are then received by the receiver of the optical surface condition monitoring system 1. The third signals include at least one signal associated with the first wavelength $\lambda_1$ and one signal associated with the second wavelength $\lambda_2$. The third signals are typically also stored in the memory of the apparatus or directly in the optical surface condition monitoring system 1. The procedure of emitting light beams at different wavelengths and receiving signals may be repeated for any integer number of sample substrates 5 with different materials.

The material of the sample surface 7 of the sample substrates 5 may be, for example, identical with old Nordic asphalt, new Nordic asphalt, old European asphalt, new European asphalt, old US asphalt, new US asphalt, concrete, stone, or any other material to be monitored by a user utilizing an optical surface condition monitoring system 1.

In other words, material dependent signals can be received by storing signals received from different sample substrates 5, thus creating a library or data base for different materials of target surfaces to be monitored by the user. Once created, the library or data base can be stored in the memory of a plurality of optical surface condition monitoring systems. This is needed in order to calculate ratios between the signals received at different distances as described above in connection with FIG. 2A and signals received at the specific distance $L_{specific}$ as described above in connection with FIG. 2B for dry calibration at a later stage. The calculation procedure is described in more detail in connection with FIG. 5.

Figure 3:
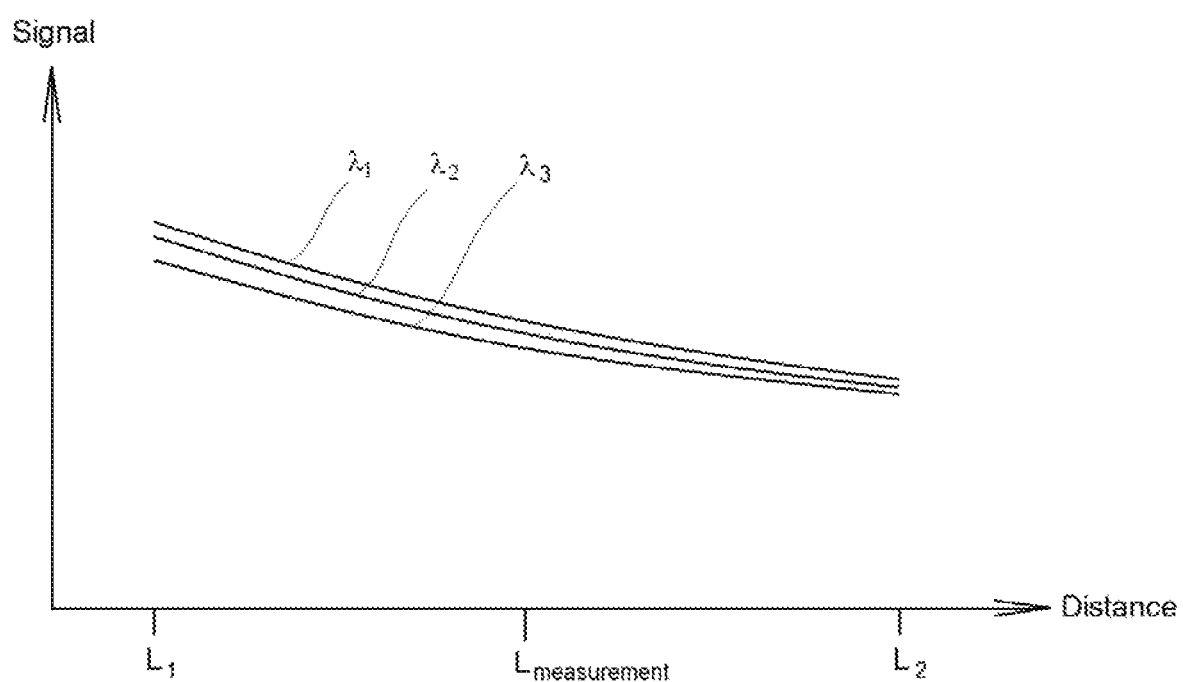
FIG. 3 illustrates a distance-signal-diagram.

In FIG. 3 a distance-signal-diagram is illustrated. A first light beam at a first wavelength $\lambda_1$, a second light beam at a second wavelength $\lambda_2$ and a third light beam at a third wavelength $\lambda_3$ have been emitted by an optical surface condition monitoring system 1 to a reference substrate 2 at different distances between the optical surface condition monitoring system 1 and the reference substrate 2. The distance between the optical surface condition monitoring system 1 and the reference substrate 2 may be varied step-wise or continuously at least from a first distance $L_1$ to a second distance $L_2$. At each distance signals scattered (back) from the reference surface 6 of the reference substrate 2 are received by a receiver 3 of the optical surface condition monitoring system 1. First signals are associated with the first distance $L_1$ and second signals are associated with the second distance $L_2$. First signals and second signals each comprise a plurality of signals associated with reflections of the first light beam at the first wavelength $\lambda_1$, the second light beam at the second wavelength $\lambda_2$ and the third light beam at the third wavelength $\lambda_3$. In other words, first signals at the first distance $L_1$ comprise three signals and second signals at the second distance $L_2$ comprise three signals according to the example shown in FIG. 3. Of course, further signals may be received at any integer number of distances between the optical surface condition monitoring system 1 and the reference substrate 2. The signals shown are unit dependent and can be stored in the optical surface condition monitoring system 1 so that system knows its own characteristic signals over a range of measurement distances.

Signal values within the range of discrete measured signal values may be mathematically interpolated or extrapolated in order to obtain estimations of further signal values. Alternatively, signal values may be continuously received by the receiver 3 while continuously varying the distance between the reference surface 6 of the reference substrate 2 and the optical surface condition monitoring system 1 from the first distance $L_1$ to the second distance $L_2$ takes place. The distance between the reference surface 6 of the reference substrate 2 and the optical surface condition monitoring system 1 may be continuously varied over a time period, for example over a time period of 1 min, from the first distance $L_1$ to the second distance $L_2$.

The received signals may be stored in a memory 4 of the optical surface condition monitoring system 1 or an apparatus 13 as described in connection with FIG. 4. As a result, unit-dependent distance dependency responses can be automatically determined after providing input data about the measurement distance $L_{measurement}$.

Figure 4:
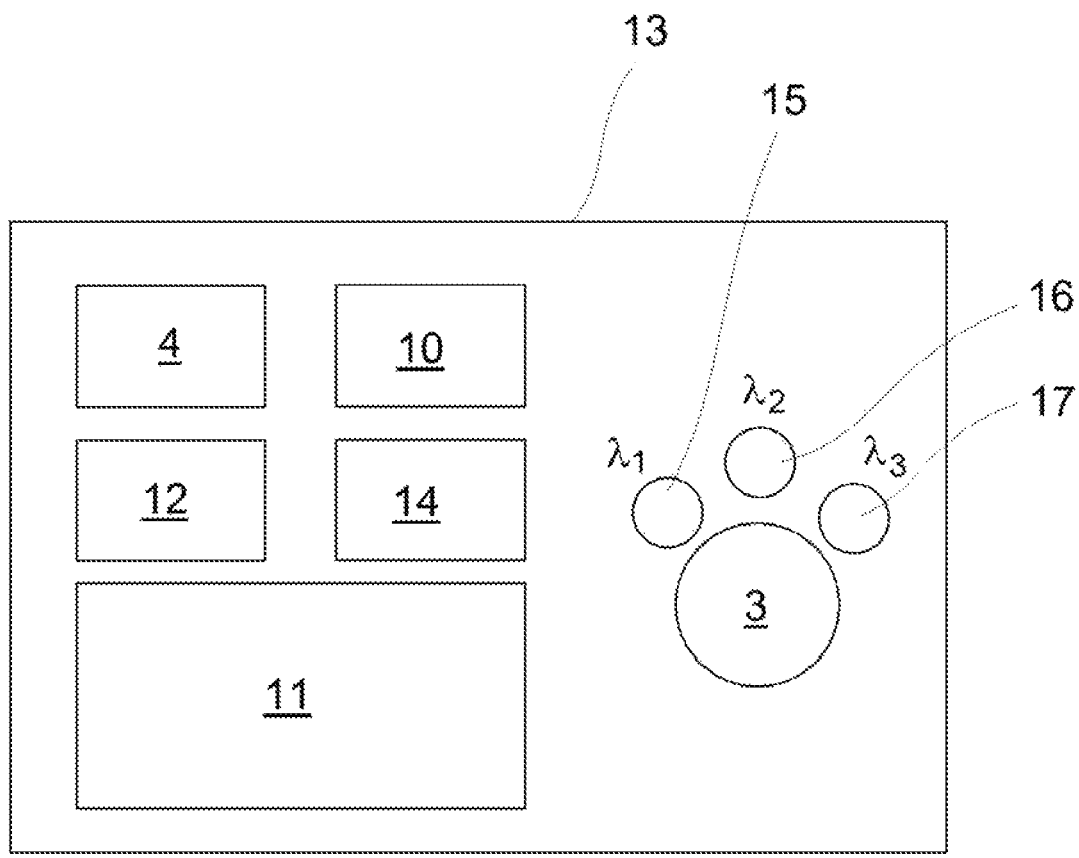
FIG. 4 illustrates an apparatus in accordance with at least some embodiments of the present invention.

In FIG. 4 an apparatus 13 in accordance with at least some embodiments of the present invention is illustrated. The apparatus 13 comprises a processor 10, which may comprise, for example, a single- or multi-core processor. A single-core processor comprises one processing core and a multi-core processor comprises more than one processing core. Processor 10 may comprise more than one processor. A processing core may comprise, for example, a Cortex-A8 processing core manufactured by ARM Holdings or a Steamroller processing core produced by Advanced Micro Devices Corporation. Processor 10 may comprise at least one Qualcomm Snapdragon and/or Intel Atom processor. Processor 10 may comprise at least one application-specific integrated circuit, ASIC. Processor 10 may comprise at least one field-programmable gate array, FPGA. Processor 10 may be means for performing method steps in apparatus 13. Processor 10 may be configured, at least in part by computer instructions, to perform actions.

The apparatus 13 further comprises at least one memory 4. Memory 4 may comprise random-access memory and/or permanent memory. Memory 4 may comprise at least one RAM chip. Memory 4 may comprise solid-state, magnetic, and/or optical memory, for example. Memory 4 may be at least in part accessible to processor 10. Memory 4 may be at least in part comprised in processor 10. Memory 4 may be means for storing information. Memory 4 may comprise computer instructions that processor 10 is configured to execute. When computer instructions configured to cause processor 10 to perform certain actions stored in memory 4, and apparatus 13 overall is configured to run under the direction of processor 10 using computer instructions from memory 4, processor 10 and/or its at least one processing core may be considered to be configured to perform said certain actions. Memory 4 may be at least in part external to apparatus 13 but accessible to apparatus 13.

The apparatus 13 yet further comprises a first light source 15 configured to emit a first light beam at a first wavelength $\lambda_1$ a second light source 16 configured to emit a second light beam at a second wavelength $\lambda_2$ and a third light source 17 configured to emit a third light beam at a third wavelength $\lambda_3$. The first light source 15, the second light source 16 and the third light source 17 may be, for example, each a laser. The laser may be a continuous wave laser or a modulated laser, for instance. Alternatively, LEDs may be used as light sources 15, 16, 17, for instance. The apparatus 13 further comprises a receiver 3. The receiver 3 is configured to receive signals scattered (back) from a target surface. The first light source 15, the second light source 16, the third light source 17 and the receiver 3 may be at least in part external to other elements of apparatus 13 but accessible at least to some of the other elements.

The at least one memory 4 includes computer program code. The at least one memory 4 and the computer program code are configured to, with the at least one processing core, cause the apparatus 13 to emit at least a first light beam at a first wavelength $\lambda_1$, a second light beam at a second wavelength $\lambda_2$ and a third light beam at a third wavelength $\lambda_3$.

The at least one memory 4 and the computer program code are further configured to, with the at least one processing core, cause the apparatus 13 to store signals received by the receiver 3, in particular first and second signals as shown and described above in connection with FIG. 3, wherein the first and second signals have been scattered (back) from a reference substrate.

The at least one memory 4 and the computer program code are further configured to, with the at least one processing core, cause the apparatus 13 to store at least third signals received by the receiver 3, wherein the third signals have been scattered (back) from a sample substrate. The third signals are associated with the specific distance $L_{specific}$. Third signals comprise a plurality of signals associated with reflections of the first light beam at the first wavelength $\lambda_1$, the second light beam at the second wavelength $\lambda_2$ and the third light beam at the third wavelength $\lambda_3$ from the sample substrate. In other words, third signals at the specific distance $L_{specific}$ comprise three signals according to the embodiment of FIG. 4. Typically, signals for a plurality of sample substrates, i.e. for an integer number of sample materials, are stored.

The at least one memory 4 and the computer program code are yet further configured to, with the at least one processing core, cause the apparatus 13 to receive input data regarding a measurement distance $L_{measurement}$ between a target surface 8 to be monitored, for example a road, and the receiver 3. Input data may be provided, for example, by an optional distance sensor 14. Input data may be alternatively received from a user utilizing a user interface 12. The user interface 12 may comprise at least one of a keyboard, a button, a touchscreen, or a microphone, for instance. A user may be able to operate apparatus 13 via the user interface 12, for example to start and stop monitoring of surface condition.

The at least one memory 4 and the computer program code are even further configured to, with the at least one processing core, cause the apparatus 13 to receive input data regarding selection of a preset program from a user. The preset program depends on the target surface to be monitored. In other words, a user can select a program, for example "monitor old asphalt", "monitor new asphalt", "monitor European asphalt", "monitor concrete", "monitor stone" and the like, from a list utilizing the user interface 12. Any integer number of preset programs may be provided. The list of preset programs may be displayed on an optional display 11 of the apparatus 13. According to certain embodiments of the present invention, a user can create and store new material dependent programs.

Furthermore, the at least one memory 4 and the computer program code are configured to, with the at least one processing core, cause the apparatus 13 to calculate ratios between the signals, which have been scattered (back) from the sample substrate, and the signals, which have been scattered (back) from the reference substrate 2 at a specific distance $L_{specific}$ between the reference substrate 2 and the at least one receiver 3. Dry calibration can then be automatically made for the selected target material based on the input data regarding the measurement distance and the calculated ratios as further explained in connection with FIG. 5 below.

The apparatus 13 may further comprise a transmitter for transmitting data, for example surface condition data, and a second receiver for receiving data, for example new program data. The transmitter and the second receiver may be configured to transmit and receive, respectively, information in accordance with at least one communication standard. The transmitter may comprise more than one transmitter. The second receiver may comprise more than one receiver. The transmitter and/or the second receiver may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example. The second receiver is configured to receive signals from an external positioning system, for example a GPS satellite signal. The apparatus 13 may comprise a single receiver for receiving data or a plurality of different receivers.

The processor 10 may be furnished with a transmitter arranged to output information from processor 10, via electrical leads internal to apparatus 13, to other systems comprised in apparatus 13. Such a transmitter may comprise a serial bus transmitter arranged to, for example, output information via at least one electrical lead to memory 4 for storage therein. Alternatively to a serial bus, the transmitter may comprise a parallel bus transmitter. Likewise processor 10 may comprise a receiver arranged to receive information in processor 10, via electrical leads internal to apparatus 13, from other systems comprised in apparatus 13. Such a receiver may comprise a serial bus receiver arranged to, for example, receive information via at least one electrical lead from receiver for processing in processor 10. Alternatively to a serial bus, the receiver may comprise a parallel bus receiver.

The processor 10, memory 4, transmitter, receiver(s), readout circuitry and/or user interface 12 may be interconnected by electrical leads internal to apparatus 13 in a multitude of different ways. For example, each of the aforementioned systems may be separately connected to a master bus internal to apparatus 13, to allow for the systems to exchange information. However, as the skilled person will appreciate, this is only one example and depending on the embodiment various ways of interconnecting at least two of the aforementioned systems may be selected without departing from the scope of the present invention.

Figure 5:
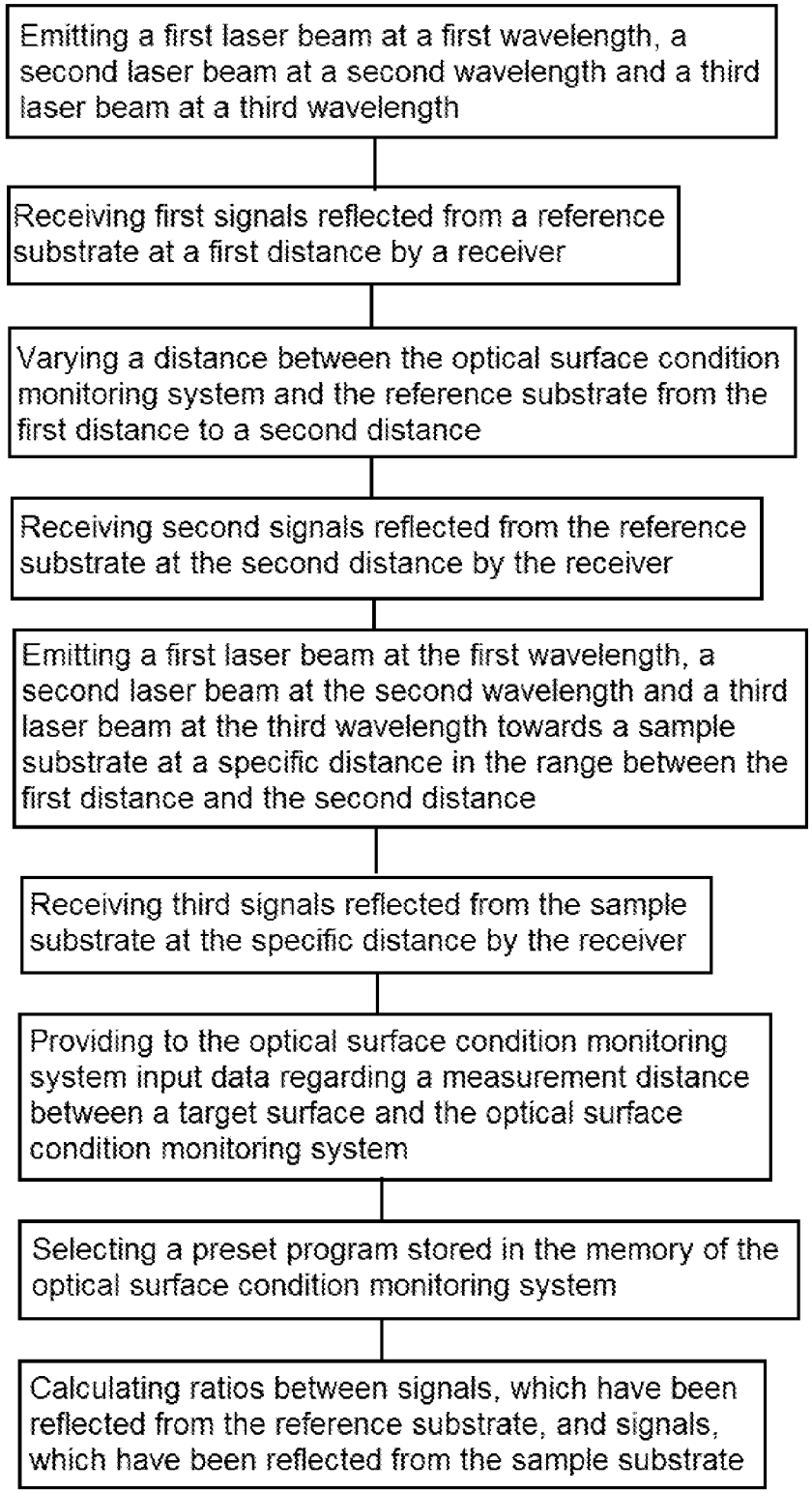
FIG. 5 illustrates a flowchart of a method of calibrating an optical surface condition monitoring system in accordance with at least some embodiments of the present invention.

In FIG. 5 a flowchart of a method of calibrating an optical surface condition monitoring system 1 in accordance with at least some embodiments of the present invention is illustrated. The method comprises emitting at least a first light beam at a first wavelength $\lambda_1$, a second light beam at a second wavelength $\lambda_2$ and a third light beam at a third wavelength by the optical surface condition monitoring system 1 to a reference substrate 2. The wavelengths of the transmitters are selected such that one signal amplitude reacts more sensitive to a liquid, in particular water, on the target surface, one signal amplitude reacts more sensitive to ice and one signal amplitude reacts less sensitive to liquids, in particular water, and less sensitive to ice.

First signals scattered (back) from a reference substrate 2 at a first distance $L_1$ are then received by a receiver 3 of the optical surface condition monitoring system 1. Subsequently, a distance between the optical surface condition monitoring system 1 and the reference substrate 2 is varied from the first distance $L_1$ to a second distance $L_2$. Second signals scattered (back) from the reference substrate 2 are received at the second distance $L_2$ by the receiver 3 of the optical surface condition monitoring system 1. From the received signals three functions Scal1(L), Scal2(L) and Scal3(L) can be determined. An example of the functions is shown in FIG. 3.

The method further comprises emitting the first light beam at the first wavelength $\lambda_1$, the second light beam at the second wavelength $\lambda_2$, and the third light beam at a third wavelength by the optical surface condition monitoring system 1 to a sample substrate which is arranged at a specific distance $L_{specific}$ from the optical surface condition monitoring system 1 in the range between the first distance $L_1$ and the second distance $L_2$. For example, the optical surface condition monitoring system 1 can be attached to a vehicle 9 and third signals scattered (back) from the sample substrate 5 at the specific distance $L_{specific}$ can be received by the receiver 3 of the optical surface condition monitoring system 1. The procedure can be repeated for different sample substrates, for example old asphalt, new asphalt, concrete, European asphalt, etc. From the received signals average values or sample values can be determined for each material. The average values or sample values may be expressed, for example for "old asphalt", as Sraw1_oldasphalt($L_{specific}$), Sraw2_oldasphalt($L_{specific}$) and Sraw3_oldasphalt($L_{specific}$).

Subsequently, target material factors can be calculated for the signals as expressed below for the example "old asphalt":

Scaler1_oldasphalt=Sraw1_oldasphalt($L_{specific}$)/Scal1($L_{specific}$)

Scaler2_oldasphalt=Sraw2_oldasphalt($L_{specific}$)/Scal2($L_{specific}$)

Scaler3_oldasphalt=Sraw3_oldasphalt($L_{specific}$)/Scal3($L_{specific}$), wherein Scaler1_oldasphalt, Scaler2_oldasphalt and Scaler3_oldasphalt are ratios, Sraw1_oldasphalt($L_{specific}$), Sraw2_oldasphalt($L_{specific}$) and Sraw3_oldasphalt($L_{specific}$) are average values or values of the sample material and Scal1($L_{specific}$), Scal2($L_{specific}$) and Scal3($L_{specific}$) are signal values of the reference substrate at the specific distance $L_{specific}$.

Target material factors can be determined for any integer number of materials and stored in the memory 4 of the optical surface condition monitoring system 1.

Subsequently, input data regarding a measurement distance $L_{measurement}$ between the target surface and the optical surface condition monitoring system is provided and a preset program relating to a specific target material is selected. Dry calibration values can then be automatically calculated as expressed below for the example "old asphalt":

Sdry1($L_{measurement}$)=Scal1($L_{measurement}$)*Scaler1_oldasphalt

Sdry2($L_{measurement}$)=Scal2($L_{measurement}$)*Scaler2_oldasphalt

Sdry3($L_{measurement}$)=Scal3($L_{measurement}$)*Scaler3_oldasphalt, wherein Sdry1($L_{measurement}$), Sdry2($L_{measurement}$) and Sdry3($L_{measurement}$) are the dry calibration values finally used, Scal1($L_{measurement}$), Scal2($L_{measurement}$) and Scal3($L_{measurement}$) are signal values of the reference substrate at the measurement distance $L_{measurement}$ and Scaler1_oldasphalt, Scaler2_oldasphalt and Scaler3_oldasphalt are the ratios as expressed above.

The input data regarding a measurement distance $L_{measurement}$ between the target surface and the optical surface condition monitoring system may be provided by a user or by a distance sensor. The preset program relating to a specific target material may be selected by the user or may be based on external positioning data such as GPS data.

The dry calibration values can be determined depending on signal values of the reference substrate at the measurement distance $L_{measurement}$ and material dependent ratios. Dry calibration can be automatically performed subsequent to providing to the optical surface condition monitoring system input data regarding the measurement distance $L_{measurement}$ and selecting a preset program relating to the target material to be monitored.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in calibration of an optical road condition monitoring system.

REFERENCE SIGNS LIST 1 optical surface condition monitoring system
2 reference substrate
3 receiver
4 memory
5 sample substrate
6 reference surface
7 sample surface
8 target surface
9 vehicle
10 processor
11 display
12 user interface
13 apparatus
14 distance sensor
15 first light source
16 second light source
17 third light source
A arrow
I first setup
II second setup
$L_1$ first distance
$L_2$ second distance
$L_{measurement}$ measurement distance
$L_{specific}$ specific distance
α attachment angle
β angle
$\lambda_1$ first wavelength
$\lambda_2$ second wavelength
$\lambda_3$ third wavelength

The invention claimed is:

1. A method for calibrating an optical surface condition monitoring system, the method comprising:
    emitting a first light beam at a first wavelength and a second light beam at a second wavelength by the optical surface condition monitoring system to a reference substrate,
    receiving first signals scattered from the reference substrate at a first distance between the optical surface condition monitoring system and the reference substrate by a receiver of the optical surface condition monitoring system,
    varying a distance between the optical surface condition monitoring system and the reference substrate from the first distance to a second distance, and
    receiving second signals scattered from the reference substrate at the second distance between the optical surface condition monitoring system and the reference substrate by the receiver of the optical surface condition monitoring system.

2. The method according to claim 1, wherein the distance between the optical surface condition monitoring system and the reference substrate is continuously or step-wise varied between the first distance and the second distance.

3. The method according to claim 2, wherein signals scattered from the reference surface are received by the receiver of the optical surface condition monitoring system during continuous or step-wise variation of the distance between the optical surface condition monitoring system and the reference substrate.

4. The method according to claim 1, wherein the reference substrate is made of an optically homogenous diffuse reflective material.

5. The method according to claim 1, wherein signals, which have been scattered from the reference substrate and received by the receiver of the optical surface condition monitoring system, and measurement distances are stored in a memory of the optical surface condition monitoring system.

6. The method according to claim 1, the method further comprising:
    emitting at least the first light beam at the first wavelength and the second light beam at the second wavelength by the optical surface condition monitoring system to a sample substrate which is arranged at a specific distance from the optical surface condition monitoring system in the range between the first distance and the second distance, and
    receiving at least third signals scattered from the sample substrate at the specific distance by the receiver of the optical surface condition monitoring system.

7. The method according to claim 6, wherein the sample substrate is made of a material or substantially made of a material of the target surface to be monitored.

8. The method according to claim 6, wherein signals, which have been scattered from the sample substrate and received by the receiver of the optical surface condition monitoring system, are stored in a memory of the optical surface condition monitoring system.

9. The method according to claim 6, the method further comprising:
    calculating ratios between the signals, which have been scattered from the sample substrate, and signals, which have been scattered from the reference substrate at the specific distance.

10. The method according to claim 9, wherein the ratios between the signals, which have been scattered from the reference substrate, and the signals, which have been scattered from the sample substrate, are stored in the memory of the optical surface condition monitoring system.

11. The method according to claim 1, the method further comprising:
    providing to the optical surface condition monitoring system input data regarding a measurement distance between a target surface and the optical surface condition monitoring system, and
    selecting a preset program stored in the memory of the optical surface condition monitoring system.

12. An arrangement comprising a first setup and a second setup, wherein the first setup comprises:
    an optical surface condition monitoring system configured to emit light beams at at least two different wavelengths, a reference substrate having a reference surface arranged at a distance from the optical surface condition monitoring system, and means for varying the distance between the optical surface condition monitoring system and the reference substrate at least from a first distance to a second distance,and wherein the second setup comprises:

the optical surface condition monitoring system, and a sample substrate having a sample surface arranged at a specific distance from the optical surface condition monitoring system, wherein the specific distance is in the range between the first distance and the second distance.

13. An apparatus comprising:

at least a first light source configured to emit a first light beam at a first wavelength and a second light source configured to emit a second light beam at a second wavelength.

at least one receiver, a processor comprising at least one processing core, and at least one memory including computer program code, the at least one memory and the computer program code being configured to, with the at least one processing core, cause the apparatus at least to:

emit at least a first light beam at a first wavelength and a second light beam at a second wavelength, store first signals received by the receiver, wherein the first signals have been scattered from a reference substrate at a first distance between the reference substrate and the receiver, store second signals received by the receiver, wherein the second signals have been scattered from the reference substrate at a second distance between the reference substrate and the receiver, store third signals received by the receiver, wherein the third signals have been scattered from a sample substrate at a specific distance between the sample substrate and the receiver, receive input data regarding a measurement distance between a target surface and the receiver, receive input data regarding selection of a preset program which depends on the target surface to be monitored, and calculate ratios between the signals, which have been scattered from the sample substrate, and signals, which have been scattered from the reference substrate at the specific distance between the reference substrate and the at least one receiver.

14. A non-transitory computer readable medium having stored thereon a set of computer implementable instructions capable of causing a computing device, in connection with an optical surface condition monitoring system, at least to:

cause a first light source to emit a first light beam at a first wavelength, cause a second light source to emit a second light beam at a second wavelength, store first signals received by a receiver, wherein the first signals have been scattered from a reference substrate at a first distance between the reference substrate and the receiver, store second signals received by the receiver, wherein the second signals have been scattered from the reference substrate at a second distance between the reference substrate and the receiver, store third signals received by the receiver, wherein the third signals have been scattered from a sample substrate at a specific distance between the sample substrate and the receiver, receive input data regarding a measurement distance between a target surface and the receiver, receive input data regarding selection of a preset program by a user, wherein the preset program depends on the target surface to be monitored, and calculate ratios between the signals, which have been scattered from the sample substrate, and the signals, which have been scattered from the reference substrate at the specific distance.

* * * * *